US012774876B2

(12) United States Patent
Sudak

(10) Patent No.: US 12,774,876 B2
(45) Date of Patent: Oct. 27, 2026

(54) TRAINING SYSTEM—MODULAR AND ADJUSTABLE SHOOT HOUSE

(71) Applicant: N.D.N. Investments Ltd., Modiin-Macabbim-Reut (IL)

(72) Inventor: Alexander Sudak, Rehovot (IL)

(73) Assignee: N.D.N. Investments Ltd., Modiin-Macabbim-Reut (IL)

( * ) Notice: Subject to any disclaimer, the term of this patent is extended or adjusted under 35 U.S.C. 154(b) by 184 days.

(21) Appl. No.: 18/657,804

(22) Filed: May 8, 2024

(65) Prior Publication Data

US 2024/0377169 A1 Nov. 14, 2024

(30) Foreign Application Priority Data

May 8, 2023 (IL) .......................................... 302780

(51) Int. Cl.
*G09B 9/00* (2006.01)
*F41J 11/00* (2009.01)

(52) U.S. Cl.
CPC ............... *F41J 11/00* (2013.01); *G09B 9/003* (2013.01)

(58) Field of Classification Search
CPC .. G09B 9/003; F41J 11/00; F41J 11/02; F16B 5/00; F16B 5/0052
See application file for complete search history.

(56) References Cited

U.S. PATENT DOCUMENTS

| | | | | |
|---|---|---|---|---|
| 10,648,780 | B2 | 5/2020 | Fornusek et al. | |
| 2007/0006542 | A1* | 1/2007 | Duke | F41H 5/04 52/561 |
| 2009/0282749 | A1* | 11/2009 | Warminsky | E04H 9/10 52/745.03 |

FOREIGN PATENT DOCUMENTS

| | | | |
|---|---|---|---|
| KR | 20050063278 | 6/2005 | |
| WO | WO-2012101171 A1 * | 8/2012 | F16B 5/0056 |
| WO | WO-2021119167 A1 * | 6/2021 | E04B 2/7422 |
| WO | WO2021256919 | 12/2021 | |

* cited by examiner

*Primary Examiner* — Robert J Utama
(74) *Attorney, Agent, or Firm* — PEARL COHEN LLP

(57) ABSTRACT

A training system includes shoot house walls connected to each other, each of the walls being constructed of a ballistic penetration-resistant material. The wall includes front and back surfaces extending from first and second edge connective structures. The first and second edge connective structures include an upright projection received in a crevice that allows for relative vertical motion between adjoining walls.

5 Claims, 3 Drawing Sheets

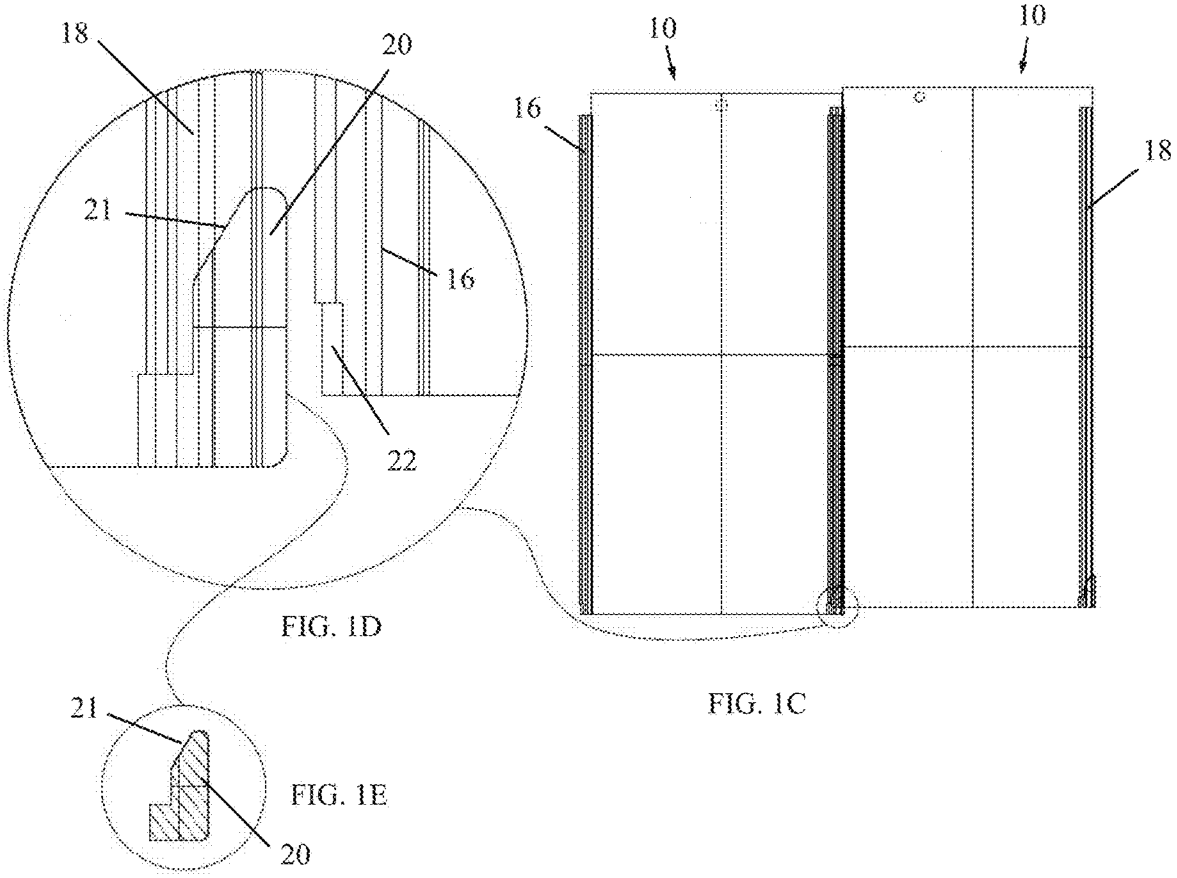
FIG. 1D
FIG. 1C
FIG. 1E
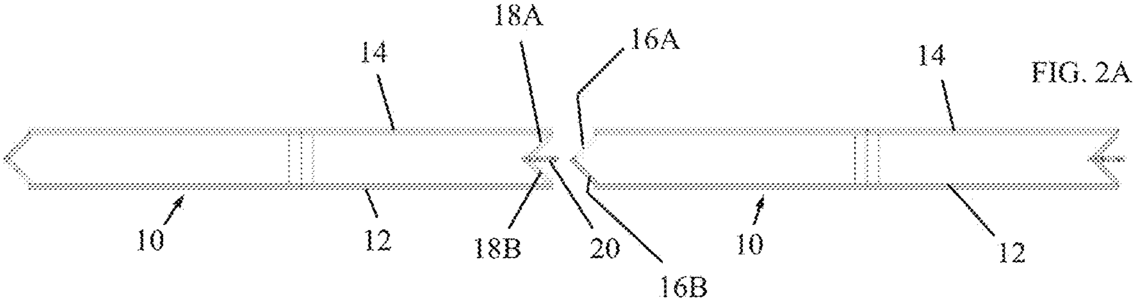
FIG. 2A
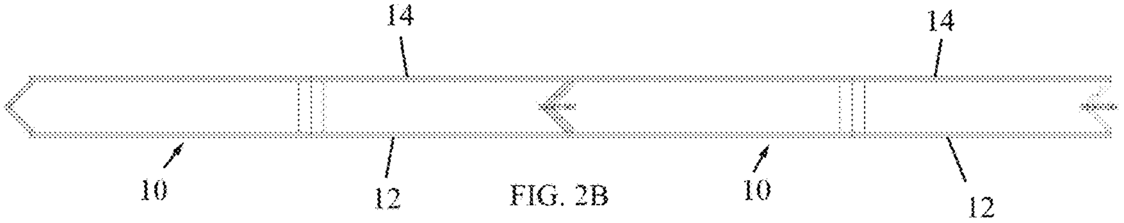
FIG. 2B

TRAINING SYSTEM—MODULAR AND ADJUSTABLE SHOOT HOUSE

CROSS-REFERENCE TO RELATED APPLICATIONS

This application claims priority to Israeli Patent Application No. 302780 filed May 8, 2023, which is hereby incorporated by reference.

FIELD OF THE INVENTION

The present invention relates generally to a shoot house for military and law enforcement personnel and, more specifically, to a modular and adjustable shoot house.

BACKGROUND OF THE INVENTION

Certain personnel such as police and members of the armed forces have jobs that require them to carry and use fire arms, and which require training in realistic settings. To accomplish this, training is often done in structures commonly known as shoot houses. These structures provide for many actual combat situations where trainees must quickly and accurately identify and respond to realistic threats to their safety.

Shoot house walls must be able to withstand the impact of multiple rounds of ammunition. Shoot house walls must also be constructed to prevent bullets from ricocheting off the wall and injuring trainees. Shoot houses have been constructed out of concrete, tires, gravel filled walls, steel walls and multi-layer steel walls. Because of the massive, thick walls used in modern shoot houses, it is difficult and cumbersome to disassemble the shoot house in order to move the walls to other positions.

SUMMARY OF THE INVENTION

The present invention seeks to provide a modular and adjustable shoot house, as is described more in detail hereinbelow.

There is provided in accordance with a non-limiting embodiment of the present invention a training system including shoot house walls connected to each other, each of the walls being constructed of a ballistic penetration-resistant material, and each of the walls including front and back surfaces extending from first and second edge connective structures, wherein the first and second edge connective structures include an upright projection received in a crevice that allows for relative vertical motion between adjoining ones of the walls.

BRIEF DESCRIPTION OF THE DRAWINGS

The present invention will be understood and appreciated more fully from the following detailed description taken in conjunction with the drawings in which:

FIG. 1C is a simplified illustration of two adjoining walls of the shoot house being connected to each other.

FIG. 1D is an enlarged view of the connecting structure of the two adjoining walls, in accordance with a non-limiting embodiment of the present invention.

FIG. 1E is an enlarged sectional view of one member of the connecting structure.

FIGS. 2A and 2B are simplified top-view illustrations of two adjoining walls of the shoot house, respectively during and after connecting the walls to each other.

DETAILED DESCRIPTION OF EMBODIMENTS

Figure 1A:
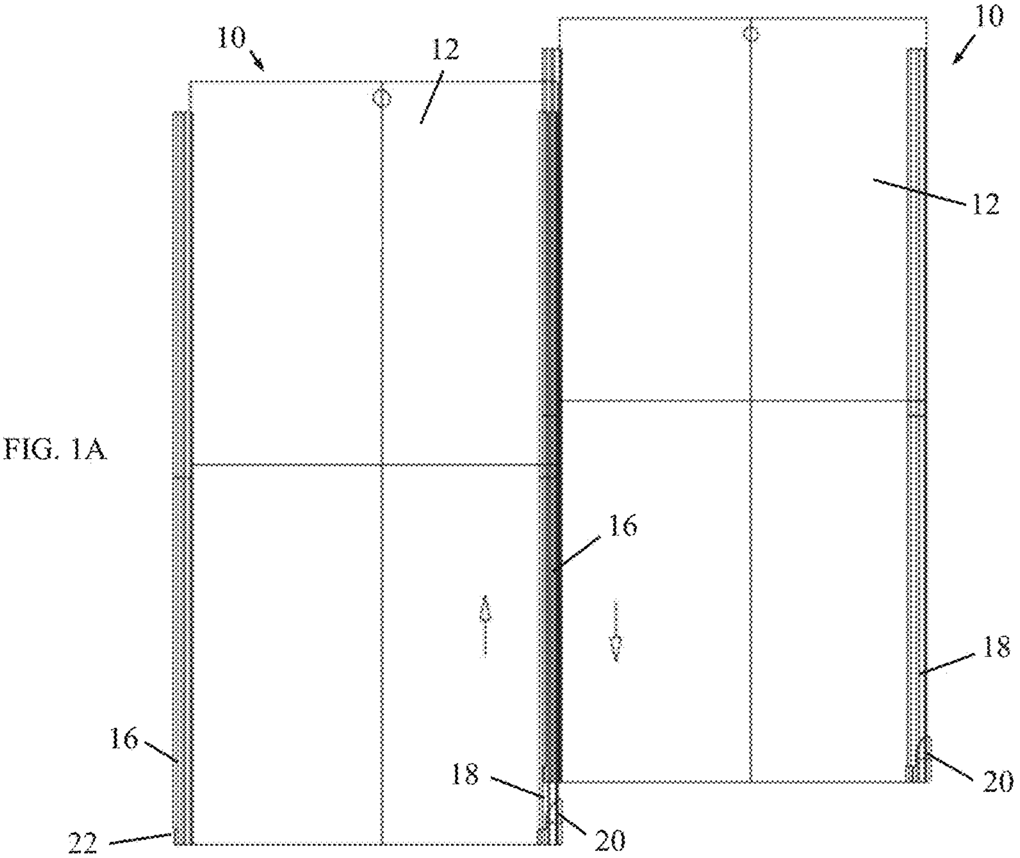
FIGS. 1A and 1B are simplified illustrations of two adjoining walls of a shoot house, respectively during and after connecting the walls to each other, in accordance with a non-limiting embodiment of the present invention.

Reference is now made to FIGS. 1A-1E and FIGS. 2A-2B, which illustrate two adjoining walls 10 of a shoot house, in accordance with a non-limiting embodiment of the present invention.

Each wall 10 may be constructed of a ballistic penetration-resistant material and which may prevent ricochets, such as but not limited to, one or more layers of steel, ballistic elastomeric or fiber materials, such as certain aramid and ultra-high-molecular-weight polyethylene (UHMWPE) fibers, or other ballistic fabric, and/or a synthetic viscoelastic polymer, such as polyisobutene or butyl rubber, and other materials.

Each wall 10 includes front and back surfaces 12 and 14 (FIGS. 2A-2B), extending from first and second edge connective structures 16 and 18. The first and second edge connective structures 16 and 18 may include mating male and female connective structures. For example, the first edge connective structure 16 may include two edge members 16A and 16B that slant outwards towards each other to form an arrow-head shape when viewed from the top as seen in FIGS. 2A and 2B. The second edge connective structure 18 may include two edge members 18A and 18B that slant inwards towards each other to form an arrow-receptacle shape when viewed from the top as seen in FIGS. 2A and 2B. As seen in FIG. 2B, the arrow-head shape of edge members 16A and 16B is received in the arrow-receptacle shape of edge members 18A and 18B when the adjoining walls 10 are connected to each other. Alternatively, other male and female connections may be used.

Reference is made particularly to FIG. 2A. The second edge connective structure 18 may include an upright projection 20 positioned in the arrow-receptacle shape of edge members 18A and 18B. The first edge connective structure 16 may be formed with a crevice or cutout 22 formed in a lower portion of edge members 16A and 16B. When connecting adjoining walls 10, the upright projection 20 is received in the crevice 22. The upright projection 20 may have a chamfered or slanted surface 21 (FIGS. 1D and 1E) that facilitates mating with the crevice 22.

The mating connection of upright projection 20 received in the crevice 22 serves multiple purposes. First, the mating connection of upright projection 20 received in the crevice 22 ensures that the adjoining walls are positively connected to each other and are not simply abutting against each other. Second, the mating connection of upright projection 20 received in the crevice 22 allows for relative vertical motion between the adjoining walls; that is, the upright projection 20 can move vertically with respect to the crevice 22 and the crevice 22 can move vertically with respect to the upright projection 20. This is important to compensate for different heights of the mounting surface, as is common in many terrains, such as sandy or rocky terrains. This allows mounting the walls 10 in virtually any environment. Third, the mating connection of upright projection 20 received in the crevice 22 enables quick and easy assembly and disassembly of the walls so that the construction of a shoot house is modular, quick and easy. No tools are required to join the walls together.

Figure 1B:
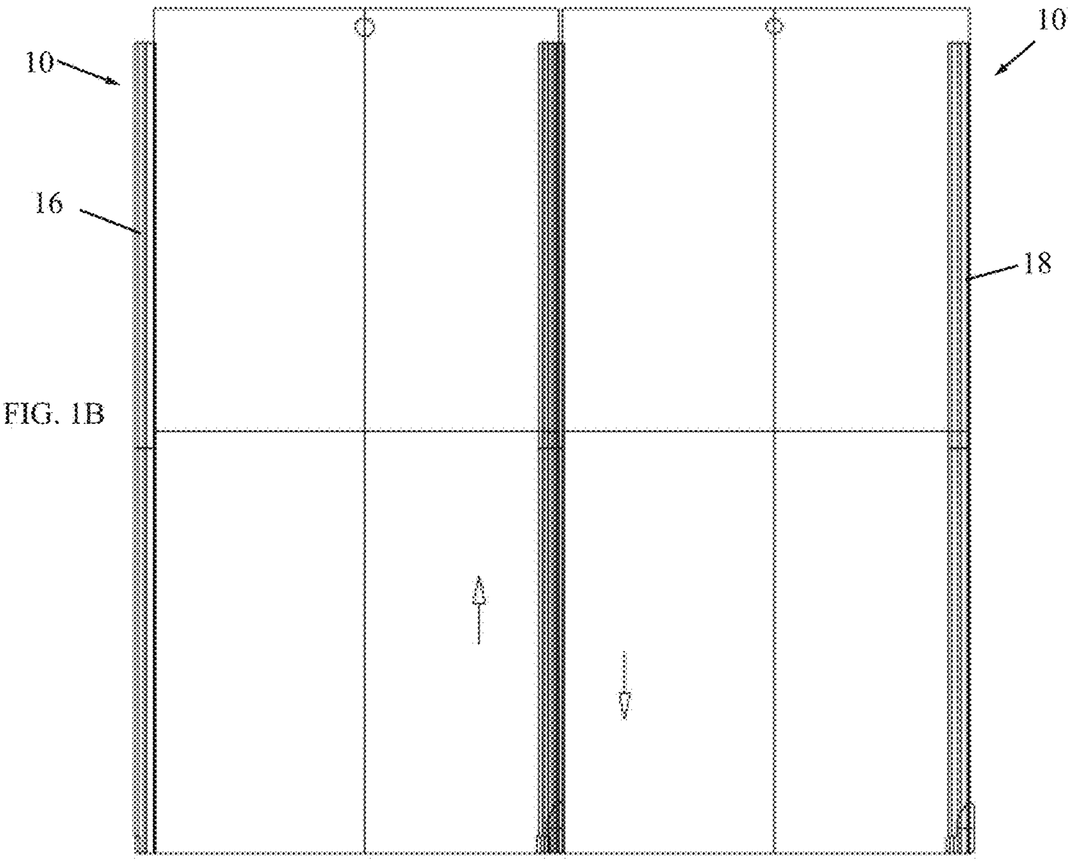
Figure 3:
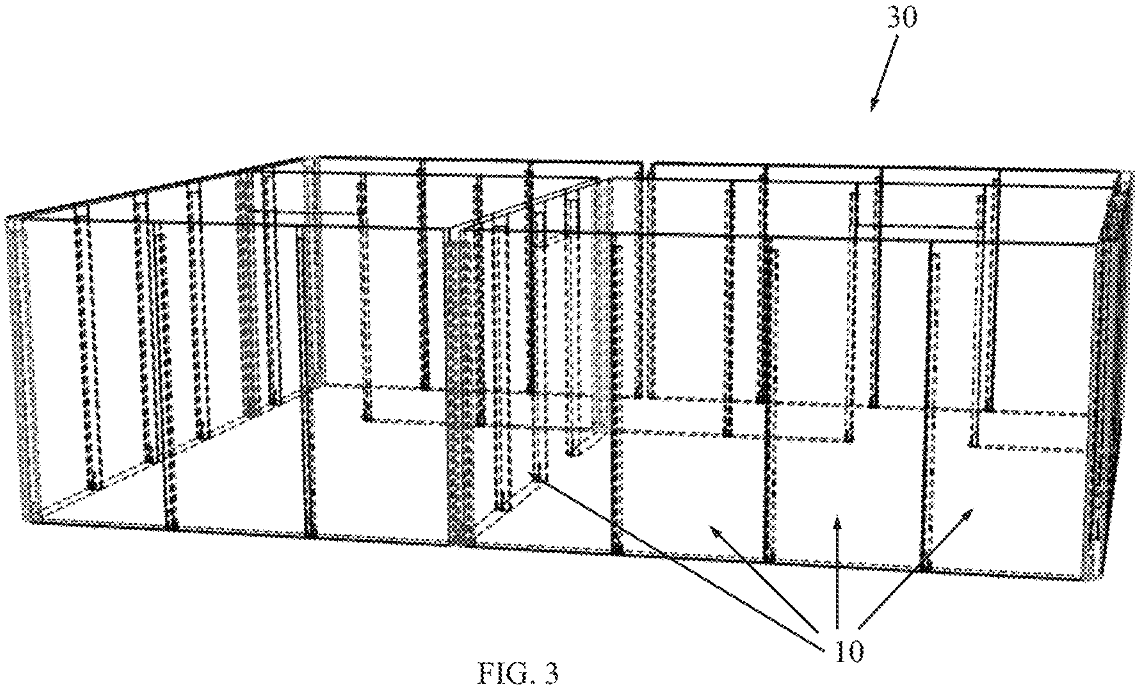
FIG. 3 is a simplified illustration of a shoot house constructed with the walls of FIGS. 1A-1B, in accordance with a non-limiting embodiment of the present invention.

FIG. 3 illustrates a shoot house 30 constructed with the walls 10 of FIGS. 1A-1B, in accordance with a non-limiting embodiment of the present invention. Any number and arrangement of wall may be used and adjusted as needed.

What is claimed is:

1. A training system comprising:

shoot house walls connected to each other, each of said walls being constructed of a ballistic penetration-resistant material, and each of said walls comprising front and back surfaces extending from first and second edge connective structures, wherein said first edge connective structure extends in an upright direction and comprises two edge members that slant outwards towards each other to form an arrowhead shape when viewed from above said walls, wherein said second edge connective structure extends in the upright direction and comprises two edge members that slant inwards towards each other to form an arrow-receptacle shape when viewed from above said walls, and wherein said second edge connective structures comprises an upright projection extending in the upright direction and received in a crevice located in said first edge connective structure that allows for relative vertical motion in the upright direction between adjoining ones of said walls.

2. The training system according to claim 1, wherein said first and second edge connective structures comprise mating male and female connective structures.

3. The training system according to claim 1, wherein said upright projection is positioned in said second edge connective structure and said crevice is formed in said first edge connective structure.

4. The training system according to claim 1, wherein said upright projection is formed with a chamfered or slanted surface.

5. The training system according to claim 1, further comprising a shoot house constructed of said walls.

* * * * *